(12) United States Patent (10) Patent No.: US 8,655,832 B2
Muller et al. (45) Date of Patent: Feb. 18, 2014

(54) PUBLISHING ACTIVITY TASKS IN A COLLABORATIVE ENVIRONMENT

(75) Inventors: Michael Muller, Medford, MA (US); Andrew L. Schirmer, Andover, MA (US)

(73) Assignee: International Business Machines Corporation, Armonk, NY (US)

( * ) Notice: Subject to any disclaimer, the term of this patent is extended or adjusted under 35 U.S.C. 154(b) by 1873 days.

(21) Appl. No.: 11/040,395

(22) Filed: Jan. 21, 2005

(65) Prior Publication Data

US 2006/0167737 A1 Jul. 27, 2006

(51) Int. Cl.
*G06F 17/30* (2006.01)

(52) U.S. Cl.
USPC .......................................... 707/608

(58) Field of Classification Search
USPC .......................................... 707/608
See application file for complete search history.

(56) References Cited

U.S. PATENT DOCUMENTS

| | | | | |
|---|---|---|---|---|
| 5,930,512 | A * | 7/1999 | Boden et al. | 717/102 |
| 6,282,531 | B1 * | 8/2001 | Haughton et al. | 706/50 |
| 6,714,913 | B2 * | 3/2004 | Brandt et al. | 705/2 |
| 7,197,502 | B2 * | 3/2007 | Feinsmith | 707/100 |
| 2001/0028364 | A1 | 10/2001 | Fredell et al. | |

OTHER PUBLICATIONS

*Redbox Organizer*; Apr. 19, 2005; http://www.inklineglobal.net/products/rbo/index.html.
*Learning Activity Management System*; Apr. 19, 2005; http://www.lamsinternational.com/product.
*! TreePad*; Apr. 19, 2005; http://www.treepad.com.

* cited by examiner

*Primary Examiner* — Thu-Nguyet Le
(74) *Attorney, Agent, or Firm* — Steven Greenberg, Esq.; Carey, Rodriguez, Greenberg & O'Keefe

(57) ABSTRACT

A method, system and apparatus for publishing activity tasks in a collaborative environment can include the step of publishing selected activity tasks for status viewing by other collaborators in the collaborative environment. In one aspect of the invention, the publishing step can include the step of publishing selected activity tasks for viewing by a subset of the collaborators in the collaborative environment. In another aspect of the invention, the publishing step can include the step of publishing selected activity tasks for viewing by the collaborators in the collaborative environment only for a specified duration. In yet another aspect of the invention, the publishing step can include both publishing selected activity tasks for viewing by the collaborators in the collaborative environment, and periodically updating a status for each of the selected activity tasks.

6 Claims, 3 Drawing Sheets

PUBLISHING ACTIVITY TASKS IN A COLLABORATIVE ENVIRONMENT

BACKGROUND OF THE INVENTION

1. Statement of the Technical Field

The present invention relates to the field of collaborative computing and more particularly to the publication of activity tasks in a collaborative computing environment.

2. Description of the Related Art

Collaborative computing refers to the use by two or more end users of a computing application in order to achieve a common goal. Initially envisioned as a document sharing technology among members of a small workgroup in the corporate environment, collaborative computing has grown today to include a wide variety of technologies arranged strategically to facilitate collaboration among members of a workgroup. No longer merely restricted to document sharing, the modern collaborative environment can include document libraries, chat rooms, video conferencing, application sharing, and discussion forums to name only a few.

A collaborative computing application enjoys substantial advantages over a more conventional, individualized computing application. Specifically, at present it is rare that a goal of any importance is entrusted and reliant upon a single person. In fact, most goals and objectives can be achieved only through the participation of a multiplicity of individuals, each serving a specified role or roles in the process. Consequently, to provide computing tools designed for use only by one of the individuals in the process can be short sighted and can ignore important potential contributions lying among the other individuals involved in the process.

Personal information managers, project management systems and workflow management systems represent three such computing applications which attempt to manage a process leading to an objective, leveraging of the participation of many individuals in the process. Considering first the personal information manager (PIM), in a PIM, a single end user can establish a calendar of events and a to-do list of tasks which are to be performed by the end user. To the extent that a task is to be performed by another individual, the end user only can establish a task reminding the end user to monitor the completion of the task by the other individual. PIMs do permit the calendaring of events among different individuals, but the calendaring operation only can "invite" others to calendar the event within the personal information manager of other users.

Project management systems provide means for an individual or a group to define and track project stages with strictly-specified interdependencies. In a traditional project management system, the phases of a project can be defined from start to finish and a timeline can be generated for the project. Utilizing the timeline, it can be determined when particular phases of the project have been completed and when a subsequently scheduled phase of the project can begin. To the extent that the timing of one phase of the project changes, the remaining project phases can be adjusted to accommodate the changed timing. Similarly, if the project requires the use of limited resources, and the allocation of one such resource changes, the remaining project phases that depend on that resource can be adjusted to accommodate the reduction of that resource. A major strength of project management systems is their maintenance of these kinds of strict interdependencies. In addition, in many project management systems, particular people can be assigned to particular phases of the project.

In these ways, the execution of a project can be better managed by a project manager using the project management system's control over timing, resources, and people. Notably, in most project management systems, the interdependencies are specified in a top-down fashion by the project manager, and the other users are relegated to the enforced subordinate tasks of confirming that components have been completed, or indicating changes in resources. Changes in interdependencies are typically executed only by the project manager.

Workflow management systems differ substantially from PIMs and project management systems. In a workflow management system, different computing processes can be linked together by an electronic specification. Moreover, in a workflow management system, it is not important whether all of the computing processes are managed by a single entity and different ones of the computing processes can be distributed about a network of diverse computing resources. In the latter circumstance, the specifying electronic document merely need reference the pertinent computing processes in a way in which the processes can be located in the value chain. Most importantly, a workflow specifies a structure of distributed processes, executed by a combination of electronic and human agents, with top-down specification of rigid contingencies that are enforced among these agents.

Learning management systems can be viewed as collaborative forms of the project manager. In a typical learning management system, a project species—namely a syllabus—can be defined to include one or more assignments. A class can be created from the syllabus, one or more instructors can be assigned to the class and one or more students can be enrolled in the class. Advantageously, additional collaborative tools can be provided to facilitate the execution of the course, including a chat room, document library and discussion forum, to name a few. Learning management systems are similar to project management systems and workflows, in that the syllabus is specified in a top-down manner by the course instructor, and is enforced on the students who must execute the learning actions in the order and timeframe specified.

Notwithstanding the foregoing, individualized PIMs, project management systems, and workflow management systems, as well as collaborative learning management systems, do not account for the actual nature of a coordinated set of collaborative tasks conducted by people, such as an activity. An activity, unlike a typical project or workflow, refers to objects, actions, and persons in the real world, and provides a computerized representation of selected aspects of those objects, actions, and persons.

Due to the individualistic nature of PIMs, and the top-down enforced nature of and project management systems, workflows, and learning management systems, tasks can be difficult to share with others who may collaborate informally or in other non-hierarchical ways to achieve a common objective. Even in a collaborative environment, sharing task knowledge with fellow collaborators can be difficult and most often requires the exchange of e-mails or instant messages specifying the status of a given task. As an alternative, a bulletin board style posting of task progress can be shared among collaborators. Yet, some tasks are not suitable for publication to all members of a collaborative group—particularly tasks of a private and sensitive nature.

Even once tasks in an activity have been completed, it can be quite helpful to reflect upon the completion of the tasks to better identify the efficacy of the activity. To properly reflect upon the efficacy of an activity, however, one must obtain a view of the historical progress of tasks across all members of a collaborative team. In conventional PIMs and project management systems, however, it is not possible to view the historical progress of different collaborators across tasks in an activity. Once again, a tedious, manual collection of data from each collaborator in the group will be required.

SUMMARY OF THE INVENTION

The present invention addresses the deficiencies of the art in respect to activity management and provides a novel and non-obvious method, system and apparatus for publishing activity tasks in a collaborative environment. In a preferred aspect of the present invention, a method for publishing activity tasks in a collaborative environment can include the step of publishing selected activity tasks for status viewing by other collaborators in the collaborative environment. In one aspect of the invention, the publishing step can include the step of publishing selected activity tasks for viewing by a subset of the collaborators in the collaborative environment.

In another aspect of the invention, the publishing step can include the step of publishing selected activity tasks for viewing by the collaborators in the collaborative environment only for a specified duration. In yet another aspect of the invention, the publishing step can include both publishing selected activity tasks for viewing by the collaborators in the collaborative environment, and periodically updating a status for each of the selected activity tasks. Notably, the method can include the step of viewing an activity task in the collaborative environment which has been published by another collaborator. Moreover, a set of published activity tasks can be aggregated in a bulletin board for viewing by a multiplicity of collaborators.

In a particular aspect of the invention, activity tasks can be published from within a unified activity manager. Specifically, a unified activity manager which has been configured in accordance with the present invention can include an activity list view having a listing of activities, each of the activities having at least one activity task. An activity view can be included which can have a rendering of properties associated with a selected activity in the activity list view. A persons and roles view also can be included which can have at least a listing of collaborators available for association with the selected activity in the activity list view. Finally, an activity task publication module can be included.

The activity task publication module can include activity task publication logic programmed to publish selected activity tasks for status viewing by other collaborators in the collaborative environment. The activity task publication module further can include activity task inquiry logic programmed to render a status view of published activity tasks based upon one of a selected collaborator or a selected collaborative role. The activity task publication module further can include activity task recording logic programmed to log a history of published activity tasks. Finally, the activity task publication module yet further can include activity task display logic programmed to display a bulletin board of published activity tasks for viewing by a set of collaborators in the collaborative environment.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for publishing activity tasks in a collaborative environment. In accordance with the present invention, a hierarchy of activity tasks can be specified. Different activity tasks can be associated with one or more collaborators and resources utilized in the completion of the activity task. Importantly, one or more activity tasks can be selected for publication for viewing by other collaborators. Subsequently, the status of the published activity tasks can be periodically updated so that collaborators viewing the published activity tasks can assess the progress of the published activity tasks.

Figure 1:
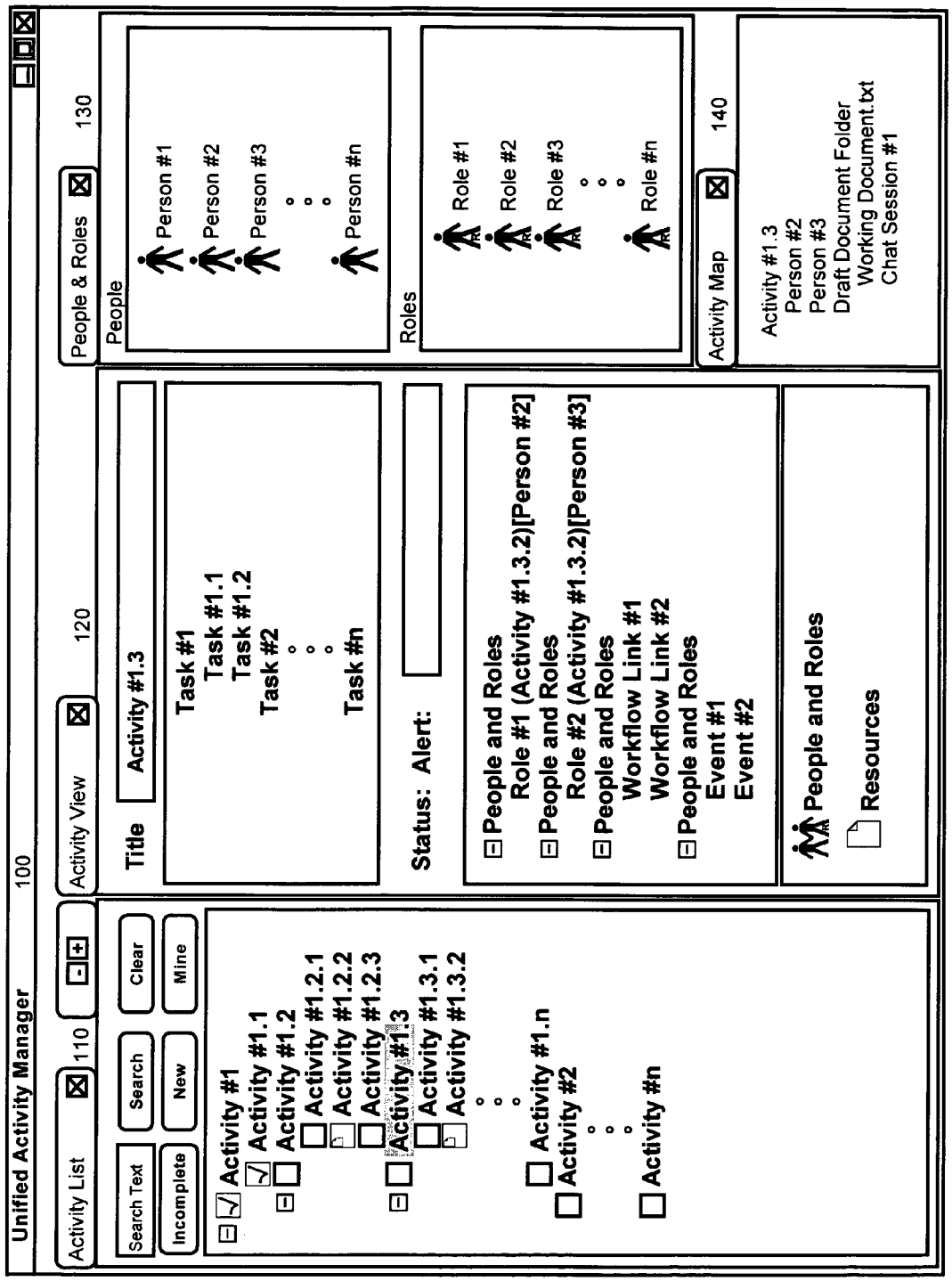
FIG. 1 is a pictorial illustration of a unified activity manager which has been configured in accordance with the present invention.

In further illustration, FIG. 1 is a pictorial illustration of a unified activity manager which has been configured in accordance with the present invention. The unified activity manager 100 can include several views including an activity list view 110, an activity view 120 and a people and roles view 130. The activity list view 110 can include a listing of one or more activities. Each activity can be decomposed into zero or more dependent activities, which together comprise a richer description of the work summarized in the original activity. Each of these dependent activities is itself an activity, but appears in a sub-activity-relationship to the original activity. This process of defining activities in sub-activity-relationship may be extended to any desired level of dependent description.

The activity view 120 can include a description of an activity task that is contained within the activity. The task description can include one or more activity tasks associated with the activity. Additionally, activity tasks can be decomposed into zero or more dependent activity tasks, which together comprise a richer procedural specification of the original activity task. Each of these dependent activity tasks is itself an activity task, but appears in a subtask-relationship to the original activity task. This process of specifying activity tasks in subtask-relationship may be extended to any desired level of dependent specification.

The activity view 120 further can include a detailed listing of the properties of a selected activity in the activity list view 110. Specifically, the detailed listing can include a listing of collaborators (people) specified for the activity. Also, the detailed listing can include a listing of collaborator roles (roles) specified for the activity. Further, the detailed listing can include a listing of events specified for the activity. Finally, the detailed listing can include a listing of links to internal workflows, external workflows or both.

The peoples and roles view 130 can include a listing of collaborators in the collaborative environment available for assignment to a specified activity in the activity list view 110. The peoples and roles view 130 also can include a listing of collaborative roles in the collaborative environment available for assignment to a specified activity in the activity list view 110. In this regard, a role can be compared to a person in that a person references a specific identity and a role references only a class of persons.

Finally, an activity map 140 can be provided. The activity map 140 can include an arranged set of electronic mail messages, calendar entries, documents, files and file folders, and applications, such as an application share, discussion thread or chat session, to name a few.

Importantly, different ones of the activity tasks can be selected for publication. Specifically, those activity tasks which are associated with a publishing collaborator can be selected by the publishing collaborator for viewing by other collaborators. Once published, activity tasks can be viewed by the other collaborators who elect to view the published activity tasks of the publishing collaborator. Moreover, the status of the published activity tasks can be updated periodically for the benefit of the other collaborators.

Figure 2:
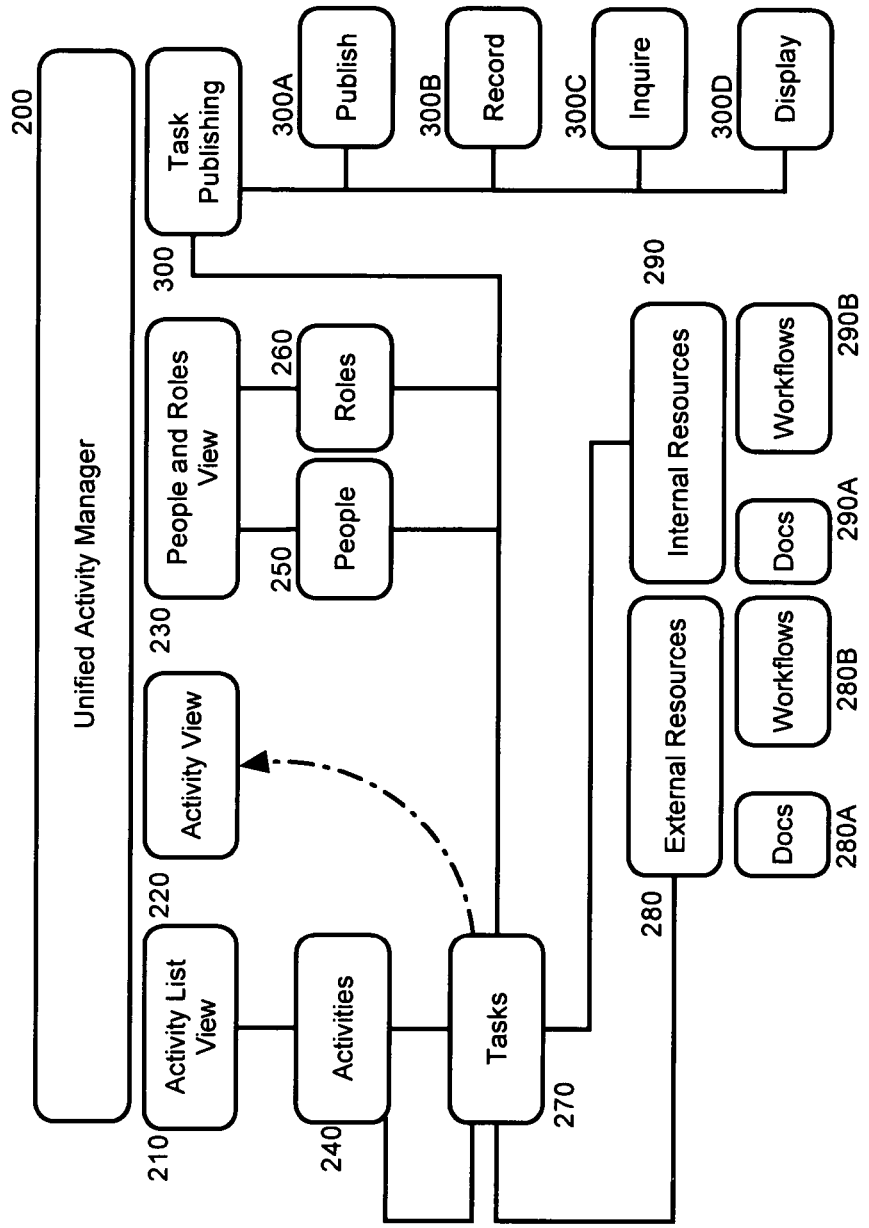
FIG. 2 is a block diagram illustrating an architecture for the unified activity manager of FIG. 1.

In more particular illustration, FIG. 2 is a block diagram which illustrates the architecture for the unified activity manager of FIG. 1. The architecture can include the unified activity manager 200 which can have an activity list view 210, an activity view 220 and a people and roles view 230. The activity list view 210 can include one or more activities 240, each activity 240 having one or more activity tasks 270 or even other activities 240 defined through a sub-activity relationship. The activity view 220 can include a visual rendering of the properties of a selected one of the activity tasks 270. Finally, the people and roles view 230 can include one or more people 250 and one or more roles 260. Importantly, references to the people 250 and roles 260 can be included in the activity tasks 270.

In accordance with the present invention, each of the activity tasks 270 optionally can include links to both internal resources 290 and external resources 280. The internal resources 290 can include internally disposed documents 290A and internally specified workflows 290B to name only two. Similarly, the external resources 280 can include externally disposed documents 280B and externally specified workflows 280B. Other resources not shown can include references to internally available collaborative tools including application shares, chat sessions, document libraries, and email messages, to name a few.

Importantly, the unified activity manager 200 yet further can include an activity task publishing module 300. The activity task publishing module 300 can include each of publishing logic 300A and inquiry logic 300C. Additionally, the activity task publishing module 300 can include record logic 300B and display logic 300D. The publishing logic 300A can manage the publication of one or more activity tasks 270 for the benefit of one or more people 250 and one or more roles 260 collaborating to complete the activity tasks 270 of one or more of the activities 240. The inquiry logic 300C, by comparison, can manage the acquisition and display of the status of activity tasks 270 for one or more people 250 and one or more roles 260.

Optionally, the record logic 300B can manage the historical logging of the status of published ones of the activity tasks 270 for one or more people 250 and one or more roles 260. In this way, collaborators can reflect on the efficacy for the activities 240 regardless of the collaborator assigned with any particular one of the activity tasks 270. Finally, the display logic 300D can manage the display of the status of published ones of the activity tasks 270 for the benefit of all viewing collaborators. To that end, the display logic 300D can manage a bulletin board of published ones of the activity tasks 270.

Figure 3:
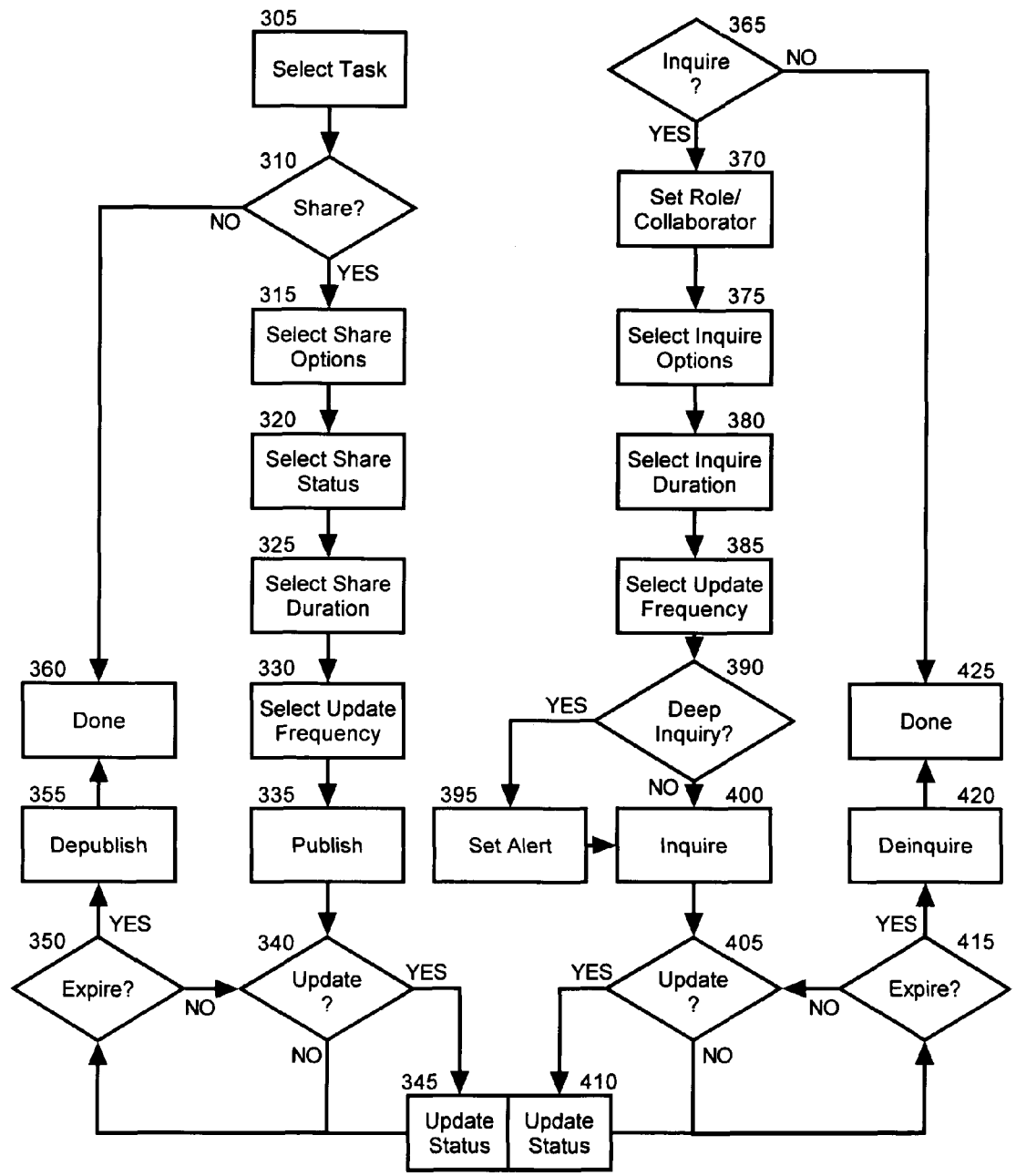
FIG. 3 is a flow chart illustrating a process for publishing activity tasks in the architecture of FIG. 2.

In further illustration of the operation of the activity task publishing module 300, FIG. 3 is a flow chart illustrating a process for publishing activity tasks in a collaborative environment. Beginning in block 305, an activity task can be selected and in decision block 310, it can be determined whether the selected activity task is to be published for viewing by other collaborators in the collaborative environment. If the selected activity task is to be published, in block 315, one or more sharing options can be selected.

These options can include identifying the class of collaborator able to view the published activity task. The class of collaborator can include characterizations based upon the position of a collaborator in a hierarchy of collaborators, the association of a collaborator with a particular entity, a listing of permissible collaborators or impermissible collaborators, or the role of a collaborator. Of course, as one option, no restrictions can be placed upon the publication of the selected activity task and all collaborators can view the status of the published activity task.

In block 320, the completion status of the selected activity task can be selected. For example, the completion status can indicate when the activity task is to be processed or completed. Also, the completion status can indicate whether or not the activity task has been completed. In block 325, a duration of publication can be specified, subsequent to which the published activity task can be removed from publication. Finally, in block 330 a frequency of updating the status of the activity task can be specified.

In block 335, the activity task can be published according to the specified options, status, duration and frequency. Subsequently, in decision block 340 it can be determined whether the frequency parameter indicates a need to update the status of the published activity task for the benefit of viewing collaborators. If so, in block 345 the status of the published activity task can be updated. In either case, in decision block 350 it can be determined whether the publication of the activity task has expired. If so, the activity task can be removed from publication in block 355 and the process can end in block 360. Otherwise, the process can repeat through decision block 340.

Once an activity task has been published, individual collaborators can subscribe to a view of the published activity task based upon a selected set of collaborators or collaborative roles in the collaborative environment. Specifically, in decision block 365 it can be determined whether a collaborator has chosen to inquire about published activity tasks. If so, in block 370 a particular collaborator or collaborative role can be established for the inquiry and in block 375, one or more viewing options can be selected such as those enumerated above. The duration of the inquiry further can be established in block 380 as can an update frequency in block 385 for refreshing the status of viewable activity tasks.

In decision block 390 it can be determined whether a "deep inquiry" is desired. A deep inquiry can include in block 395 the specification of an alert according to trigger rules such as the state of a published activity task. Examples can include triggering an alert when a parameter in the activity task changes to a certain value, or exceeds a certain value, or falls below a certain value. Other examples can include a change in state for the activity task, or when the activity task attains a specified state.

In any case, in block 400, the inquiry can be processed and the status of the published activity tasks for the selected collaborators or collaborative roles can be displayed. In decision block 405, it can be determined whether the status of the published activities is to be updated. If so, in block 410, the status of the published activity task can be updated. In either case, in decision block 415 it can be determined whether the inquiry into the published activity task has expired. If so, the activity task can be removed from inquiry in block 420 and the process can end in block 425. Otherwise, the process can repeat through decision block 405.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for publishing activity tasks in a collaborative environment, the method comprising the steps of:
    selecting one or more activity tasks in an activity displayed in an activity list view of a unified activity manager for display in an activity view, the unified activity manager rendered in a user interface of a computer system, the activity view comprising a concurrent visual rendering of properties including a listing of collaborators and a listing of collaborator roles for an activity task selected in the unified activity manager; and,
    publishing on request of a publishing collaborator the selected activity tasks for status viewing by other collaborators on a bulletin board executing in memory of the computer system in the collaborative environment.

2. The method of claim 1, wherein said publishing step comprises the step of publishing selected activity tasks for viewing by a subset of said collaborators in the collaborative environment.

3. The method of claim 1, wherein said publishing step comprises the step of publishing selected activity tasks for viewing by said collaborators in the collaborative environment only for a specified duration.

4. The method of claim 1, wherein said publishing step comprises the steps of:
    publishing selected activity tasks for viewing by said collaborators in the collaborative environment; and,
    periodically updating a status for each of said selected activity tasks.

5. The method of claim 1, further comprising the step of viewing an activity task in the collaborative environment which has been published by another collaborator.

6. The method of claim 1, further comprising the step of aggregating a set of published activity tasks in the bulletin board for viewing by a plurality of collaborators.

* * * * *